United States Patent [19]

Siemer

[11] Patent Number: 4,820,965
[45] Date of Patent: Apr. 11, 1989

[54] CONTROL CIRCUIT FOR BATTERY CHARGER

[75] Inventor: Dennis K. Siemer, Mankato, Minn.

[73] Assignees: Maurice A. Sween; B. Marily Sween, both of Lake Crystal, Minn.

[21] Appl. No.: 29,264

[22] Filed: Mar. 23, 1987

[51] Int. Cl.$^4$ ............................................. H02J 7/04
[52] U.S. Cl. ........................................ 320/31; 320/40
[58] Field of Search ................. 320/11, 30, 31, 32, 320/39, 40, 48, DIG. 2

[56] References Cited

U.S. PATENT DOCUMENTS

| | | | |
|---|---|---|---|
| 3,048,763 | 8/1962 | Cady | 320/39 |
| 3,576,487 | 4/1971 | Chase | 320/39 |
| 3,624,481 | 11/1971 | Macharg | 320/39 |
| 3,652,915 | 3/1972 | Eberts | 320/31 |
| 3,748,568 | 7/1973 | Ackermann | 320/31 |
| 3,835,362 | 9/1974 | Greene | 320/31 X |
| 3,864,617 | 2/1975 | Smith et al. | 320/32 X |
| 4,346,336 | 8/1982 | Crawford | 320/31 X |
| 4,395,672 | 7/1983 | Gassaway | 320/31 |
| 4,443,752 | 4/1984 | Newman | 320/40 X |
| 4,562,398 | 12/1985 | Kotlarewsky | 320/31 |
| 4,581,571 | 4/1986 | Hansen | 320/31 X |
| 4,602,204 | 7/1986 | Hase | 320/11 X |

Primary Examiner—R. J. Hickey
Attorney, Agent, or Firm—Harold D. Jastram

[57] ABSTRACT

A control circuit for connection between a battery charger and a battery being charged, which includes a control switch in series between the charger and battery for disconnecting the battery under a variety of conditions including improper connection, loss of battery charger power, improper connection, and shorting of terminals. A switch connected in the series between a battery charger is closed in response to a low voltage condition in a battery and is open in response to a fully charged condition of the battery. An over-current circuit opens the switch and disconnects the battery charger from the battery when excessive currents are detected in the control system. An under voltage circuit also keeps the switch open when low voltages are detected prior to connection to a battery thus protecting the circuit from short circuits and similar mishaps in the connection of the charger and battery. A ripple detecting circuit constantly monitors the entire system and opens the switch between the battery charger and battery when power is not delivered from a battery charger thus preventing discharge of the battery through the control circuit systems.

12 Claims, 2 Drawing Sheets

CONTROL CIRCUIT FOR BATTERY CHARGER

BACKGROUND OF THE INVENTION

Wet cell batteries are used in a variety of applications, including automobiles, boats, recreational vehicles, backup power supply purposes and the like. Such batteries are used in a wide variety of climatic conditions ranging from extremely hot dry climates to frigid climates, all of which place a great deal of stress on such a power source and frequently result in discharge of such batteries. Consequently, frequent recharge of such batteries is necessary in order to maintain maximum power output from the batteries and insure proper operation of other systems which depend upon such electrical power sources.

Frequently when wet cell batteries are used in vehicles such as automobiles, the automobile supplies generation power for the purpose of recharging the battery. In many applications, however, recharging through the primary power plant of the vehicle is not possible and consequently a battery charger must be used from time to time in order to restore the storage battery to its full potential. An example of such use might be in connection with supplying power to recreational vehicles where there is little or no opportunity to recharge the battery. A battery charger then has to be applied to the storage battery for a period of time to restore the charge. Frequently, inexperienced people must connect such battery chargers to the storage battery and have little understanding of the method of connecting the charger to the storage battery with the result that the power leads from the battery charger are frequently placed on the improper terminals of the battery with the attendant possibility of damage to the battery charger.

Further, certain applications of storage battery power require that the battery be maintained at an optimum level at all times. This requires that the battery charger be connected to the battery for extended periods of time. If the charger is connected to a storage battery for an extended period of time, there is always the risk that the battery will become overcharged if proper observation is not maintained by an operator. If a battery is overcharged, it may be damaged through depletion of the electrolyte from overheating. Overcharging can also generate excess hydrogen gas. Excess hydrogen gas can lead to a dangerous explosion if there are any sparks in the vicinity of the storage battery while the hydrogen gas is being generated through the recharging process.

Some attempts have been made to provide circuitry for permanent connection of a battery charger to a storage battery for recharging purposes. However, many of these attempts have been unsuccessful since the circuitry does not accomplish adequate multiple monitoring of the electrical condition existing between the battery and the charger and also such control circuits fail to identify a disconnection of the battery charger from the power source. The result may lead to discharge of the battery through the control circuitry and/or the battery charger circuitry.

Frequently battery charger control circuits utilize a time delay method of terminating the charging process with the result that the battery itself is not charged to the optimum potential prior to the time that the charger is disconnected from the battery. Such time delay and termination circuits frequently also require an operator to reconnect the charger to the battery thus requiring constant monitoring by an operator.

SUMMARY OF THE INVENTION

It is an object of the present invention to provide a control circuit for constantly monitoring the charging of a battery by a battery charger.

Another object of the present invention is to provide a control circuit for controlling a battery charger which constantly detects the presence of a ripple current to monitor continuous operation of a battery charger connected to a power source and a battery being charged.

A further object of the present invention is to provide a battery charger control system which constantly monitors the charge in a storage battery and connects or disconnects a battery charger from the battery as needed, depending upon the charge condition of the storage battery.

Another object of the present invention is to provide a control circuit for a battery charger which senses over current loads which may be generated in the control circuit.

A further object of the present invention is to provide a circuit which detects under voltage to protect against shorting of output leads upon improper connection of the circuitry to a storage battery.

A further object of the present invention is to provide a control circuit for constantly monitoring the voltage condition of a storage battery and to connect a battery charger to the storage battery when a low voltage condition is detected at the storage battery and to provide constant monitoring to insure that the battery charger is constantly connected to the battery without generating a drain on the storage battery itself.

A further object of the present invention is to provide a control circuit for a battery charger which permits the charger to be constantly attached to the storage battery and provide constant monitoring of the voltage condition of the battery while insuring that the battery charger is continuously connected to the storage battery through the use and detection of a ripple current that occurs in the output from the battery charger unit.

Yet another object of the present invention is to provide a control circuit for a battery charger which provides for constantly connecting a battery charger to a storage battery while protecting the battery from accidental discharge of the battery through the control circuit.

Another object of the present invention is to provide a control circuit for a battery charger which prevents the development of sparking conditions in or near the storage battery due to accidental shorting of electrical leads in order to prevent accidental explosion of storage battery gases, or depletion of storage battery electrolyte.

The invention is, more particularly, a battery charger control circuit which permits a battery charger to be continuously connected to a storage battery of the wet cell type to continuously monitor the voltage condition of the storage battery without danger of overcharging the battery and also without the danger of discharging the battery through the control circuits. The control circuit provides protective circuitry which prevents improper connection of the control circuitry and battery charger to the storage battery and avoids sparks which could cause explosion of the hydrogen gases in a wet cell storage battery in the event connecting leads are inadvertently grounded, crossed or otherwise misconnected when the control circuit is being connected to the storage battery or removed from the storage battery. The control circuitry also provides a constant monitoring to determine that the battery charger is constantly connected to an A C source of power for application of D C power to the storage battery when low voltage conditions are detected at the storage battery.

BRIEF DESCRIPTION OF THE DRAWINGS

A better understanding of the invention will be obtained by reference to the detailed description below in conjunction with the following drawings in which.

DESCRIPTION OF THE PREFERRED EMBODIMENT

Figure 1:
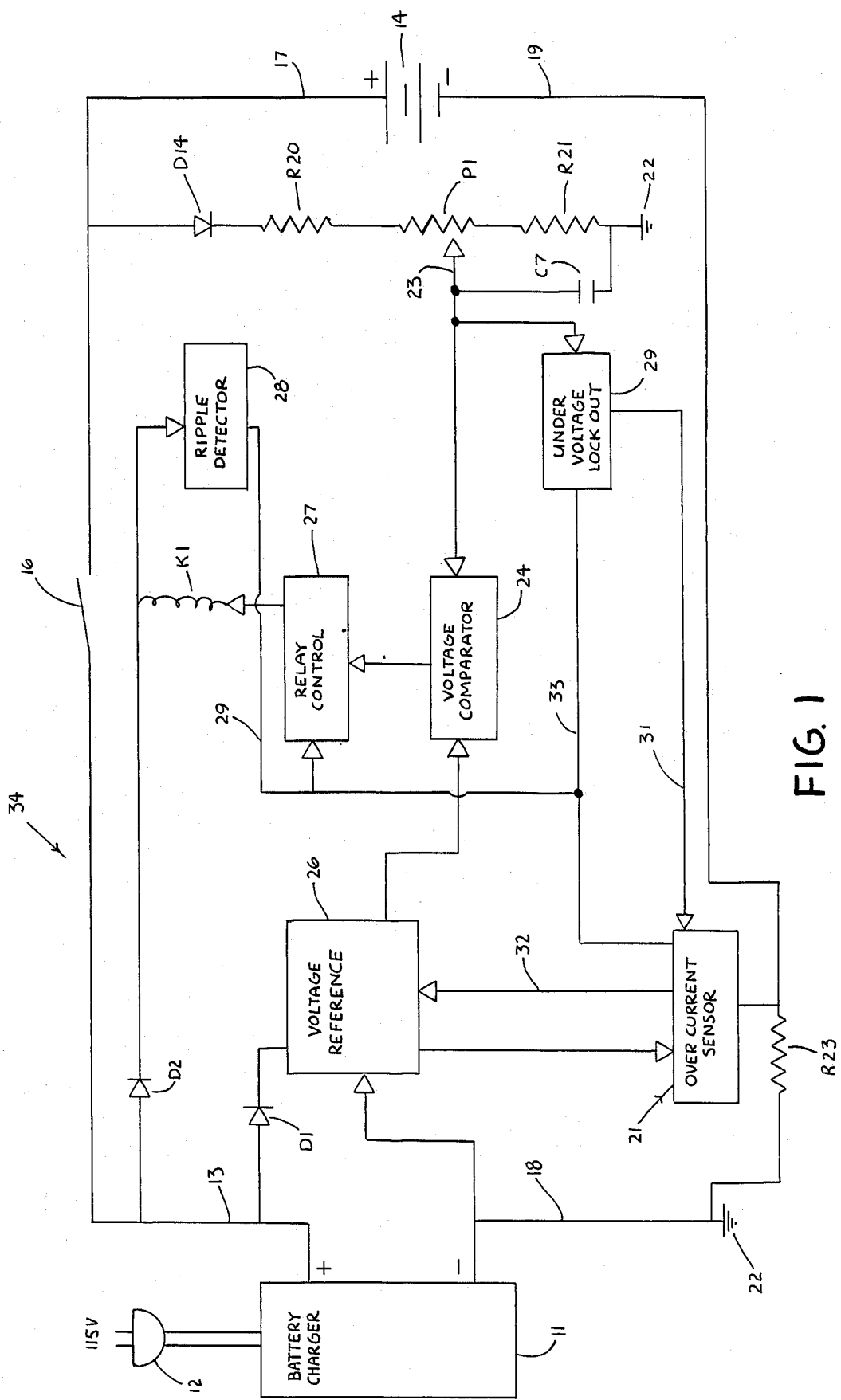
FIG. 1 is a block diagram of a control circuit for a battery charger according to the present invention and FIG. 2 is a schematic diagram of a circuit according to the preferred embodiment of the invention.

Refer first to the block diagram of FIG. 1 which illustrates an embodiment of a control circuit generally designated by numeral 34 innerconnecting a battery charger 11 and a storage battery 14 under charge. The battery charger 11 is a typical battery charger which is powered from the usual 110 to 115 Volt A C power supply 12. The positive pulsating D C output on line 13 is applied to the positive side of battery 14 through a relay contact 16 and line 17. The negative output side of the battery charger 11 is connected to the negative side 19 of battery 14 through an overcurrent sensing system 21 which is connected to the battery charger by line 18. Over current sensor 21 is a safety circuit which opens relay 16 in the event the battery is shorted or other over current conditions exist. The function of the over current sensor 21 will be more fully described in connection with a specific and detailed description of the elements of the circuit in connection with FIG. 2 of the drawings.

A potentiometer P1 is used to measure the voltage drop across battery 14 in order to determine the voltage condition of battery 14. P1 is connected to line 17 through a diode D14 and a resistor R20 on one side of the potentiometer P1 and to ground 22 through resistor R21. Ground 22 is slightly different from the ground of battery 14 by the slight voltage drop generated across resistor R23. This voltage drop difference will be more fully explained hereinafter. For practical purposes, the diode D14, resistor R20, potentiometer P1 and resistor R21 provide a high impedance voltage detection circuit connected in parallel across battery 14.

A voltage determined by the output from wiper 23 of the potentiometer P1 is applied to a voltage comparator 24. A reference voltage is also applied to voltage comparator 24 from voltage reference 26. If voltage comparator 24 detects a low voltage from wiper 23, then this is an indication that battery 14 is generating a low voltage and needs to be recharged. Under these conditions voltage comparator 24 sends a signal to relay control 27 which in turn produces current flow in relay coil K1. Relay coil K1 is connected to relay 16 and closes relay 16 to connect the positive side of the DC output on line 13 from battery charger 11 to line 17 to initiate the charging cycle for battery 14.

The charging cycle will continue until potentiometer P1 detects that the voltage output from battery 14 is at full charge at which point the voltage signal sent to voltage comparator 24 will be again compared to the signal from voltage reference 26 with the result that voltage comparator 24 will terminate the control signal to relay control 27 and open the relay 16 thus terminating the charging of battery 14 by the battery charger 11.

A feature of the invention is the use of a ripple detector 28 which is connected to line 13 of the battery charger 11 through diode D2. Ripple detector 28 is designed to constantly monitor the operating condition of battery charger 11. The DC output from battery charger 11 is not a constant D C but rather is a pulsating D C output having a "ripple component" through line 13 since the D C output is generated by rectifying 115 V. A C power. This pulsating D C output component is frequently referred to as a ripple current. The presence of this ripple current is detected by ripple detector 28 while battery charger 11 is connected to a power source 12 and is generating a D C output on output line 13. In the event that output from battery charger 11 is terminated, the ripple current detected by ripple detector 28 will cease. When this occurs, ripple detector 28 sends a signal via line 29 to relay control 27 which opens the relay 16. Note that ripple detector 28 is needed and operates only when relay 16 is closed. In the event that relay 16 is open and the battery charger 11 output is terminated, then all except a limited part of the control system is in the inoperative condition.

An under voltage lockout 29 is provided to protect the control system 34 from accidental shorting of the output leads 17 and 19. In the event that these leads are shorted or if one of these leads is grounded against a car body, the under voltage lockout 29 comes into play. In normal circuits, crossing of leads 17 and 19 or contact of one of the leads against the car body might result in sparking. This sparking could in turn create a substantial hazard if there are fumes from gasoline under the car hood or if there are hydrogen fumes existing in or near the battery 14. Under voltage lockout 29 is used to prevent this type of hazard. Under voltage lockout 29 is connected between wiper 23 and voltage reference 26 through leads 31 and 32. When under voltage lockout 29 detects a very low voltage condition at a time when relay 16 is open, the low voltage condition is compared to the voltage reference from voltage reference 26. The result is an output from under voltage lockout 29 which is applied on line 33 to relay control 27 to open relay 16.

Over current sensor 21 also is a safety system designed to avoid short circuits. In the event of an extremely high current flow in the control circuit 34 which would damage the system, over current sensor 21 signals relay control 27 to open relay 16 thus protecting the circuit from unusually high circuit overloads. Such overloads might be experienced in the event that the battery should become shorted internally or if a car is started without disconnecting the battery charger or in similar situations where high current might be generated in the control circuit 34.

Figure 2:
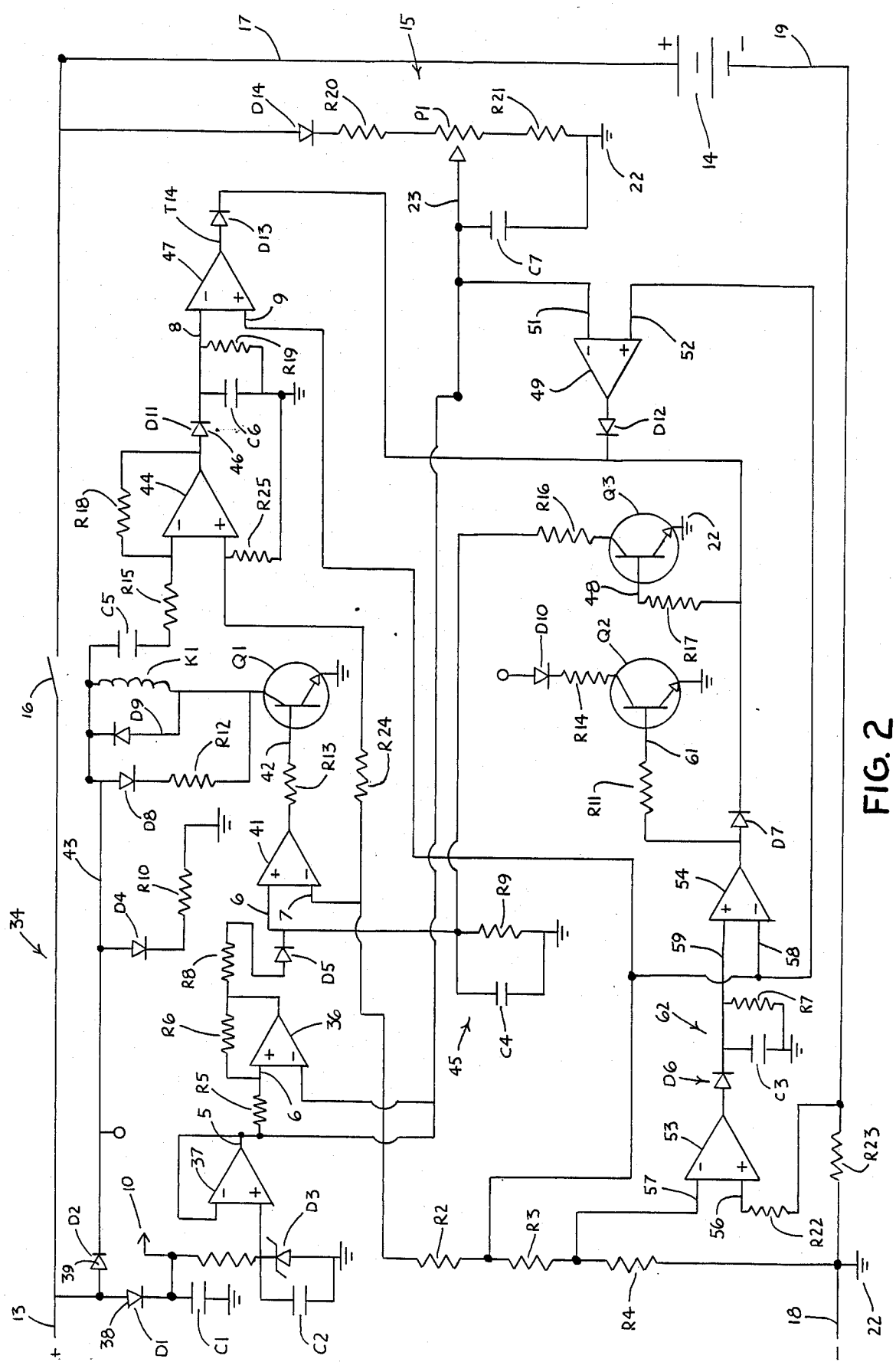

Refer now to the schematic diagram in FIG. 2 of the drawings which illustrates a control circuit 34 constructed according to the present invention.

The control circuit is connected to battery charger 11 either as a permanently wired system or as a separate system. If the control circuit generally designated by numeral 34 is a separate unit, then the positive line 13 is connected to the positive output of battery charger 11 and the line 18 is connected to the negative output of battery charger 11. Next, control circuit 34 is connected to battery 14 which is to be charged or maintained by connecting line 19 to the negative post of the battery and line 17 to the positive post of the battery. Thus connected, relay 16 is connected in series between the battery charger 11 and the battery 14 in the positive side of the line. It will be noted at this point that the circuit may also be arranged so that relay 16 appears in the negative side of the line with only minor readjustments of the various components and still function within the scope contemplated by the invention. When the battery charger is properly connected through the control circuit to battery 14, diode D 4 which is a light-emitting diode, will be connected through resistor 10 to ground 22 and will indicate to the operator that the circuit is properly connected and that it is receiving power from the battery charger 11.

If the battery 14 needs to be charged, a low voltage condition in battery 14 will be detected by a voltage sensing network which consists of diode D14, resistor R20, potentiometer P1 and resistor R21. The voltage sensed by the potentiometer P1 is fed through wiper 23 to terminal 1 of comparator 36. A reference voltage is fed to terminal 2 of comparator 36 through resistor R5 from a voltage follower 37.

Power is applied to voltage follower 37 through terminal 3. Resistor R1 is a current limiting resistor that biases a Zener diode D3 to a current level that is adequate to allow Zener diode D3 to operate within a proper voltage limit when the input voltage applied to resistor R1 and Zener diode D3 fluctuates during normal operation. Diode D1 protects the control circuit 34 in operation since it permits current only to pass in the proper direction into the system when anode 38 is connected to the positive output of the battery charger 11. Diode D2 likewise is a circuit-protecting diode which protects the other parts of the control circuit 34 from damage in the event of improper connection of the control circuit to the battery charger 11 by only permitting the control circuit to become energized when anode 39 is also connected to the positive side of battery charger 11.

Capacitor C1 acts as a filter. Capacitor C1 filters the DC input voltage applied to the control circuit 34 and removes excess ripple voltage variations that may be present in the input voltage source. Capacitor C1 also acts as a transient absorbing device in the same manner. Pin 10 is the terminal for applying power to the comparators, amplifiers and voltage followers of the circuit 34.

Thus, voltage follower 37, when properly connected to a voltage source such as the battery charger 11, will produce an output reference voltage which is applied to terminal or pin 2 through resistor R5. Resistor R5 and resistor R6 establish an electrical hysteresis voltage for comparator 36. This hysteresis voltage is established when the input signal to comparator 36 causes the output from pin 4 to be positive, current through resistors R5 and R6 cause the pin 2 to be at some fixed positive potential with respect to the common that is determined by the resistance values of resistors R5 and R6, the output voltage on pin 4, and the input voltage to resistor R5 coming from pin 5 of voltage follower 37. When the voltage applied to pin 1 of comparator 36 is below that of the voltage applied at pin 2, there will be an output at pin 4 of comparator 36. This output is the signal which will ultimately cause relay 16 to be closed so that the battery 14 will be charged by the battery charger 11.

The output at pin 4 of comparator 36 also influences the operation of comparator 36 through resistor R6 to prevent the comparator 36 output from rapidly alternating between high and low voltage levels. This is accomplished by applying the output from pin 4 of comparator 36 through resistor R6 to pin 2. The sensed input voltage applied to comparator 36 at pin 1 must rise above the value applied at 2 before the output from voltage on pin 4 will go low. When the output voltage at pin 4 goes low, the voltage at pin 2 also goes to some lower value again determined by the resistance value of resistors R5 and R6. When this happens, the input voltage or sensed voltage applied to pin 1 from potentiometer P1 must now go to a lower value less than that on 2 before the output from comparator 36 at pin 4 will again go high. Thus it can be seen that resistors R5 and R6 cooperate to prevent rapid oscillation of the comparator 36 as voltages change.

As long as the sense voltage applied to pin 1 of comparator 36 is below that of pin 2, there will be output from pin 4 applied through resistor R8 and diode D5 to isolator circuit 41. The isolator circuit or comparator 41 is used to isolate the comparator circuit 36 and a timing circuit composed of capacitor C4 and resistor R9 from a transistor Q1. When comparator 36 is generating an output at pin 4, a voltage is applied to pin 6 of comparator 41. This output also charges capacitor C4, which together with resistor R9 forms a time delay circuit 45 that has a fast charge time and slow discharge time. When the output from pin 4 of comparator 36 goes high, capacitor C4 quickly charges through resistor R8. Resistor R8 limits the charge current to capacitor C4 to a value that the internal circuit of comparator 36 can easily provide. When the voltage at pin 4 of comparator 36 goes to a low voltage, diode D5 is reverse biased and comparator C4 must now discharge through resistor R9. Since resistor R9 is a value many times greater than the resistance of resistor R8, capacitor C4 takes much longer to discharge than to charge. This slow discharge time for the timing circuit permits the battery 14 to be charged just slightly higher than called for by the voltage sensing circuit generally designated by numeral 15 and which includes diode D14, resistor R20, potentiometer P1 and resistor R21. In this way, the battery 14 will be charged somewhat beyond the voltage value called for with the result that rapid recycling of the system will not occur.

Comparator 41 then acts as an isolator circuit isolating the timing circuit 45 including capacitor C4 and resistor R9 from the relay drive transistor Q1. Output from comparator 41 is applied to transistor collector 42. When the voltage applied to pin 6 is above a reference voltage applied to pin 7, comparator 41 will generate an output voltage which is applied through resistor R13 to transistor collector 42.

Output will continue from comparator 41 as long as the voltage applied to pin 6 is higher than the reference voltage applied at pin 7. It will be seen that the voltage applied to pin 6 will continue for a short period of time after no voltage is applied to pin 6 from comparator 36 because capacitor C4 will discharge and hold the level of the voltage at pin 6 at a higher level for a limited period of time dependent on the size of resistor R9. This time period can be predetermined by a proper selection of the size of capacitor C4 and resistor R9. An example of an acceptable time period might be 20 seconds.

The signal from comparator 41 applied to collector 42 forward biases the base emitter junction of Q1 which in turn causes current to flow through the energizing coil K1 of relay 16. When current is flowing through coil K1, relay 16 is closed and applies direct current power to battery 14.

When transistor Q1 is forward biased with current flowing through coil K1, current also flows through light-emitting diode D8 and resistor R12 from the positive side of the battery charger output to ground 22 through transistor Q1. Light-emitting diode D8 is an amber light-emitting diode that alerts the operator to the fact that the control circuit 34 is applying a charging voltage to the battery since relay 16 is closed. Resistor R12 limits the current through light-emitting diode D8 to a level that is safe for transistor Q1 and the light-emitting diode D8.

Diode D4 is a green light-emitting diode which is connected from the positive output of battery charger 11 through resistor R10 to ground 22. Diode D4 emits a green light to let the operator know that the control circuit 34 is properly connected to battery charger 11 and is receiving energy from battery charger 11.

Power will continue to be applied to battery 14 to charge the battery as long as relay 16 is closed. This condition will continue until the voltage sensed at pin 1 of comparator 36 approaches the voltage applied to pin 2 of comparator 36. When this occurs, the output at pin 4 from comparator 36 will fall with the result that the output from isolator circuit 41 will also fall. This reduces the signal applied to transistor Q1 which will then shut down and terminate any further flow of current through coil K1 from line 43 to ground 22. Under these conditions, relay 16 will be opened and the battery charger 11 will be disconnected from the now fully charged battery 14.

As indicated in connection with FIG. 1, a ripple detector 28 is provided to detect a ripple current from battery charger 11 which indicates that the battery charger 11 is properly connected to the battery 14 and thus the battery 14 will not discharge through the entire control circuit 34. The ripple detector 28 contains an amplifier 44 which is illustrated in FIG. 2 of the drawings. Amplifier 44 is a ripple amplifier circuit which is connected to the positive output of battery charger 11 through line 13, diode D2, capacitor C5 and resistor R15. The gain of the ripple amplifier circuit 44 is set by the resistance values of resistor R18 and R15. The ratio of resistor R18 divided by resistor R15 is about 200, which is the gain of amplifier 44. The amplified ripple signal from amplifier 44 is applied to anode 46 of diode D11. This signal is passed through diode D11 and filtered by capacitor C6. Resistor R19 serves to discharge capacitor C6 when there is no ripple signal from amplifier 44. Resistors R24 and R25 are connected in the circuit to eliminate a feedback condition which may exist when pin 9 of comparator 47 is connected at the junction of resistor R2 and R3.

The filtered D C voltage developed across capacitor C6 is applied to the input pin 8 of comparator 47. A reference voltage is applied to pin 9 of comparator 47. The high output signal is developed at pin 5 of comparator 47 when the voltage signal applied to pin 8 lower than that on input pin 9. When this condition exists, diode D13 is forward biased and in turn forward biases the base emitter 48 of transistor Q3. Thus it will be apparent that when ripple current is not present at pin 8 of comparator 47 this means that the control circuit 34 is not properly connected to the battery charger 11, the battery charger 11 is not generating proper voltage or the control circuit 34 is not connected to the battery charger 11 at all. When this condition exists, the voltage signal at pin 8 is below that of the reference voltage applied to pin 9 and comparator 47 generates a signal to forward bias transistor base emitter 48 and cause transistor Q3 to ground the timing circuit 45 and also to effectively ground the signal applied to pin 6 of comparator 41. When pin 6 is grounded, then comparator 41 shuts down and activates transistor Q1 which in turn terminates current flow through coil K1. This opens the relay 16 and disconnects the battery charger 11 from battery 14. Thus it will be apparent that when ripple current is not present at terminal 8 of comparator 47, the relay 16 will be opened effectively disconnecting the charger 11 from battery 14. This prevents battery 14 from discharging through the battery control circuit and also through the battery charger in the event battery charger 11 malfunctions or is disconnected.

Under voltage lockout 29 illustrated in FIG. 1 of the drawings is also illustrated by reference to comparator 49 of FIG. 2 of the drawings. The sensed voltage from wiper 23 of potentiometer P1 is also applied to terminal 51 of comparator 49. The sensed voltage is compared by comparator 49 to a reference voltage applied to input terminal 52. The voltage applied to terminal 52 is a reference voltage applied from a point between resistors R2 and R3. As an example, the voltage at pin 52 could be approximately a one volt reference. The purpose of comparator 49 is to keep the relay 16 from closing if the output voltage between leads 17 and 19 is less than a predetermined voltage level such as one volt. This condition, where the voltage at the leads 17 and 19 is less than one volt, might occur if the leads are crossed or shorted together. Under voltage lockout 29 is important if the battery charger 11 is connected to a power source prior to connection to the battery 14. Shorting might occur if an operator is careless in handling leads 17 and 19 and permits them to cross or if the leads are inadvertently grounded to the body of an automobile. These conditions may cause sparking to occur and if the control circuit 34 is used in connection with automobiles where gasoline fumes may exist or near a battery which has generated hydrogen gas, a dangerous explosion could occur. Consequently the comparator 49 acts as an under voltage lockout to prevent sparking which will in turn result in potentially dangerous conditions in the vicinity of the control circuitry. In the event that the comparator 49 senses a low voltage relative to the input voltage or reference voltage at input 52, the comparator 49 will produce a output through diode D12 which is applied to the base emitter 48 of transistor Q3. Again, as described in connection with comparator 47, when transistor Q3 is forward biased, the transistor Q3 opens a circuit to ground through resistor R16 to reduce the voltage applied to pin 6 at comparator 41 with the result that comparator 41 output will be reduced to zero and terminate any further flow of current through coil K1. Again, under these conditions, relay 16 will be opened shutting down the circuitry.

Next refer to comparators 53 and 54 which make up an over-current sensor system which was identified as over-current sensor 21 in FIG. 1 of the drawings. Resistor R23 is a low resistance resistor which serves to develop a small voltage drop at high currents. This voltage is applied to pin 56 of comparator 53 and is compared to a voltage on pin 57 taken at a low voltage level developed between resistors R3 and R4. Resistor R22 is used to protect the input of comparator 53 from the effects of high transient input currents that may be present across resistor R23 under short circuit conditions. Under high current conditions, comparator 53 generates an output which is applied to the anode of diode D6 which applies a voltage to pin 59 of comparator 54. Again note that comparator 54 has a reference voltage taken from between resistors R2 and R3 applied to input pin 58. Diode D6, capacitor C3 and resistor R7 make up a fast charge-slow discharge timing circuit generally designated by numeral 62 which functions in the same fashion as the timing circuit 45 described in connection with capacitor C4 and resistor R9. Here these components, capacitor C3 and resistor R7 cause the current overload situation to quickly activate comparator 54 to generate an output which is applied to the base emitter 61 of transistor Q2 and also to the base emitter 48 of transistor Q3. Comparator 54 isolates the time circuit generally designated by numeral 62 from the base emitter 48 of transistor Q3. Thus, when a high current condition is sensed at pin 56, comparator 53 generates a signal which is applied to the time circuit 62 and to the comparator 54. Comparator 54 generates a signal which is applied through diode D7 to the base emitter 48 of transistor Q3. This then again forward biases transistor Q3 which opens the path from terminal T8 of comparator 41 to ground 22 thus shutting down transistor Q1 and reducing the current flow in coil K1 to open relay 16. It is also noted at this point that time circuit 45 is also discharged to ground 22 through transistor Q3 as it was when a signal was generated from comparator 47.

Diode D10 is a red light emitting diode that alerts the operator of the system to the fact that a high current overload exists in the circuit and that the condition has activated the circuit to disconnect the control circuit 34 from the battery 14. Resistor R14 serves to limit the current through diode D10 and the collector of transistor Q2 to a value that will permit the safe nondamaging operation of the components. Transistor Q2 acts as a current amplifier to drive diode D10 with a relatively low current available from the output of comparator 54.

Resistor R11 limits the input current to the base emitter 61 of transistor Q2 to a level that transistor Q2 can safely handle.

As previously noted, transistor Q3 is used to quickly remove the charge stored in capacitor C4 of timing circuit 45. When transistor Q3 is turned on as previously indicated, the charge in capacitor C4 is shunted to ground 22 through the collector emitter circuit of transistor Q3. Resistor R16 is a resistor of small resistance and limits the current level through transistor Q3 to a safe level.

Diodes D7, D12 and D13 also function as isolation diodes that are used to keep the output voltages of comparators 54, 49 and 47 from interfering with each other. It is noted that each of these comparators applies voltage to the common points in the control circuit 34. Thus it can be seen that when the control circuit 34 is properly connected between the battery charger 11 and the battery 14 and with the relay 16 open, the control circuit acts as a constant monitoring system. Battery 14 is prevented from discharging through the battery charger 11 and the control circuit 34 because relay 16 is open. The only discharge that occurs between the battery and the circuitry of control circuit 34 is through the sensing circuitry 15 which is made up of diode D14, resistor R20, potentiometer P1 and resistor 21. The resistance in this sensing or monitoring circuit 15 however is very high so that the current drain through the circuit is as little as 02 milliampers. This level of current drain is very low as compared to the level of current drain from the internal current drain in the battery and typical circuits connected to them and accordingly it will be apparent that the level is relatively insignificant. This drain can nevertheless be controlled by the proper choice of resistance components for the monitoring circuit 15 which is connected in parallel from line 13 to ground 22 in the circuit. It is noted at this point that the negative side of battery 14 and ground 22 are slightly different by the level of the voltage drop generated by resistor R23. For practical purposes, the monitoring circuit however is connected in parallel across the battery 14. Also, all ground symbols used in the drawings refer to ground numeral 22 whether so numbered or not. Capacitor C7 is connected between line 23 and ground 22 and acts as a filter to suppress transient currents that may be present.

Although the foregoing is set forth as a full and complete description of the disclosed embodiment of the present invention, it will be apparent to those skilled in the art that numerous alterations and modifications may be made without departing from the spirit and scope of the invention as defined in the following claims. As an example, with slight modifications, relay 16 may be placed in series in the negative side of the system. Further, choices of the size of the various capacitors and resistors might be made to vary the function. As an example, the time for charging and discharging the timing circuits 45 and 62 may be varied dramatically by a variation in the choice of capacitor sizes and resistor sizes chosen for those circuits.

What is claimed is:

1. A control circuit for an AC operated battery charger having a direct current output and for connection to a battery for charging the battery, the control circuit comprising an electrical relay connected in series between a first electrical side of the output of said charger and a terminal of said battery of the same polarity as said first electrical side, voltage drop means interconnecting a second electrical side of the output of said charger with a terminal of said battery of the same polarity as said second electrical side of the output of said charger for generating a voltage drop, detection means in parallel with said battery for detecting the battery voltage level of said battery, voltage reference means for generating a voltage of predetermined voltage level, a voltage comparator means interconnecting said voltage reference means and said detection means for comparing the battery voltage with the predetermined voltage level, relay control means interconnecting said voltage comparator means and said relay to close said relay and apply power from said charger to said battery when the battery voltage level is below a predetermined voltage level and for opening said relay when the battery voltage level reaches said predetermined voltage level, overcurrent sensor means connected to said voltage drop means for detecting a high current flow and also connected to said relay control means to open said relay, under voltage means interconnecting said detection means and said relay control means for activating said relay control means when a predetermined low voltage is detected in said control circuit and ripple detector means interconnecting said battery charger and said relay control means to open said relay when no ripple voltage output is detected from said battery charger.

2. A control circuit in accordance with claim 1 in which said relay control means includes a time delay means which is connected to said voltage comparator means and becomes electrically charged by an electrical output from said voltage comparator means and in which said time delay means discharges at a lower rate than the rate of charging by the electrical output from said voltage comparator means when the electrical output from said voltage comparator means is terminated.

3. A control circuit in accordance with claim 1 in which said overcurrent sensor means includes a time delay means for continuing an output from the overcurrent sensor means for a predetermined time period after an overcurrent condition detected by the overcurrent sensor means has terminated.

4. A control circuit in accordance with claim 1 which includes a light emitting diode connected between the first and second electrical sides of the battery charger and through said overcurrent sensor means to visually indicate an overcurrent condition in said control circuit when overcurrent sensor means is generating an output.

5. A control circuit in accordance with claim 1 which includes a light emitting diode connected between the first and second electrical side of the battery charger for visually indicating the battery charger is connected to said battery and is functioning.

6. A control circuit in accordance with claim 1 which includes a light emitting diode connected between the first and second electrical sides of the battery charger and through said relay control means to visually indicate charging voltage is being applied to said battery.

7. A control circuit in accordance with claim 2 in which the relay control means further includes an isolator circuit connected between said time delay means and said relay to electrically separate said time delay means and said relay.

8. A control circuit in accordance with claim 1 in which said voltage reference means includes a voltage follower circuit for generating a reference signal applied to said voltage comparator means.

9. A control circuit in accordance with claim 1 in which said ripple detector means includes a ripple voltage amplifier for amplifying the ripple component of the DC output from the battery charger.

10. A control circuit in accordance with claim 1 in which said detection means in parallel with said battery includes a diode connected to said first electrical side of the output from said battery charger, a potentiometer, a resistor interconnecting a first side of said potentiometer to said diode and a resistor interconnecting a second side of said potentiometer to ground and in which said ground is above the negative ground of said battery by a voltage level predetermined by the magnitude of said voltage drop means.

11. A control circuit in accordance with claim 1 in which a first diode interconnects the first electrical side of the output of said battery charger and said voltage reference means and in which a second diode interconnects the first electrical side of the output of said battery charger and said ripple detector means whereby said first and second diodes prevent damage to said control circuit from application of reverse polarity DC power to said control circuit.

12. A control circuit in accordance with claim 1 which further includes a transistor interconnecting said relay control means and ground and in which each of said ripple detector means, said overcurrent sensor means and activate said transistor to ground said relay control means and further including diode means connected to said transistor to electrically separate said overcurrent sensor means said under voltage means and said ripple detector means.

* * * * *